Dec. 1, 1953           H. BERGER           2,661,411
AUTOMATIC FLUID LEVEL SIGNAL FOR AUTOMOBILES
Filed Nov. 13, 1952           2 Sheets-Sheet 1
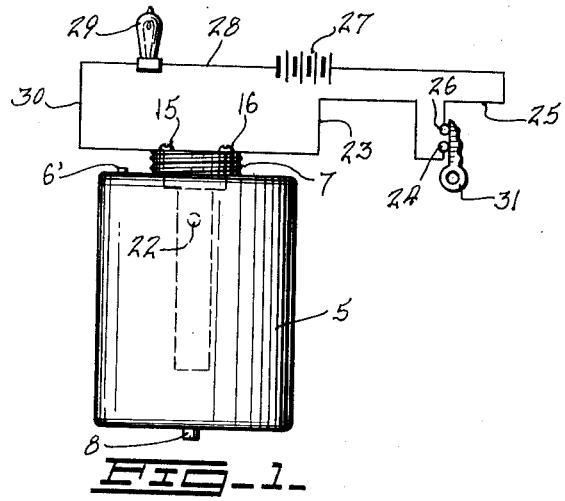
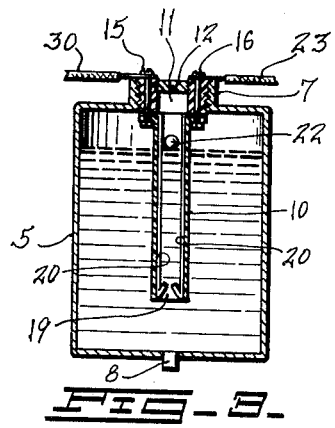
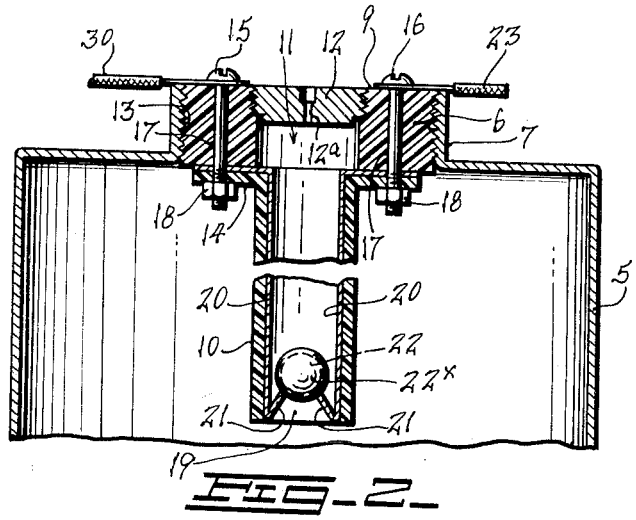
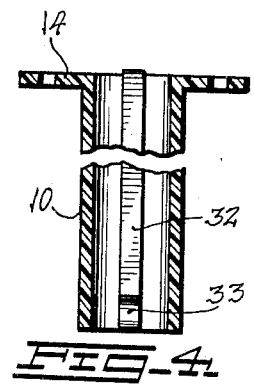
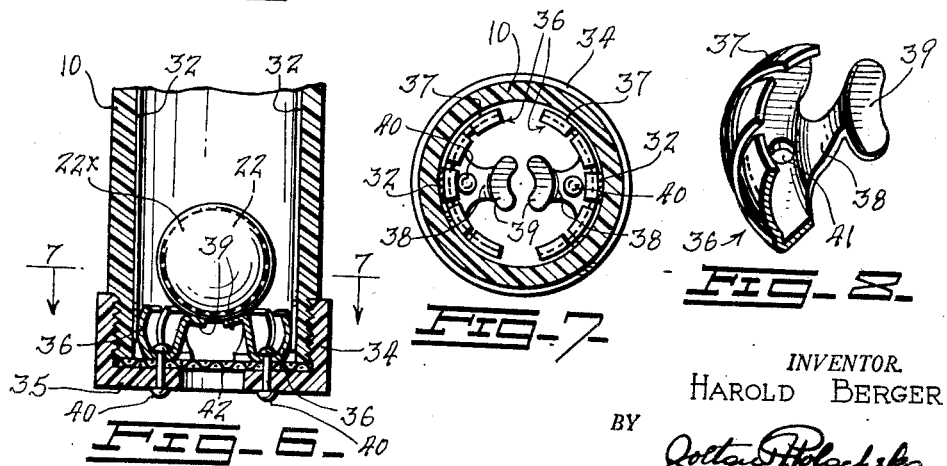
INVENTOR.
HAROLD BERGER
BY
ATTORNEY Dec. 1, 1953
H. BERGER
2,661,411
AUTOMATIC FLUID LEVEL SIGNAL FOR AUTOMOBILES
Filed Nov. 13, 1952
2 Sheets-Sheet 2
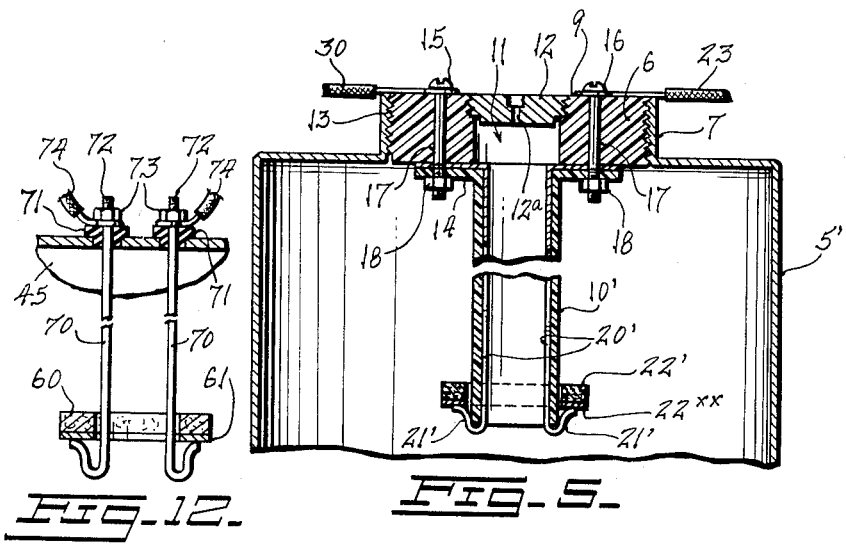
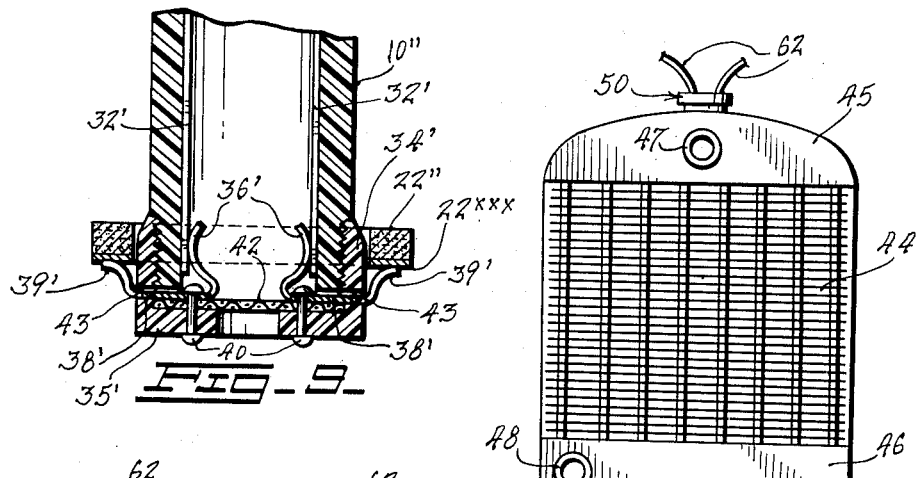
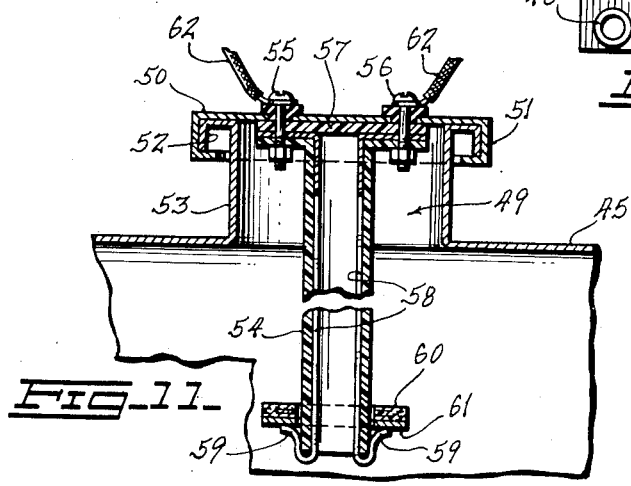
INVENTOR.
HAROLD BERGER
BY
ATTORNEY Patented Dec. 1, 1953

2,661,411

UNITED STATES PATENT OFFICE 2,661,411

AUTOMATIC FLUID LEVEL SIGNAL FOR AUTOMOBILES

Harold Berger, Bronx, N. Y.

Application November 13, 1952, Serial No. 320,299

11 Claims. (Cl. 200—84)

1

This invention relates to automatic fluid level signals and more particularly to a safety gauge for automobiles and the like.

A principal object of the present invention is to provide an oil and water gauge for automobiles including an illuminative signal when the level of the oil or the like in the tank has reached a predetermined level.

A further object of the invention is to provide an electrically operated alarm gauge having a floating movable contact member, responsive to the rise and fall of the fluid in a tank.

Yet another object of the invention is to provide an electrically operated alarm gauge capable of use with the ignition system of the automobile.

It is a further object of the invention to provide an alarm gauge of this character which is simple and durable and which can be manufactured and sold at a reasonable cost.

For further comprehension of the invention, and of the objects and advantages thereof, reference will be had to the following description and accompanying drawings, and to the appended claims in which the various novel features of the invention are more particularly set forth.

In the accompanying drawings forming a material part of this disclosure:

Fig. 1 is a part elevational and part diagrammatic view of one form of the invention applied to a supply tank.

Fig. 2 is a fragmentary vertical sectional view on an enlarged scale, showing the float in closed circuit position.

Fig. 3 is a vertical sectional view showing the float in open circuit position.

Fig. 4 is a vertical sectional view of the housing with a modified form of conductor.

Fig. 5 is a view similar to Fig. 2 but showing modified forms of stationary and floating contacts.

Fig. 6 is a fragmentary vertical sectional view showing another modification of the invention.

Fig. 7 is a cross-sectional view taken on the plane of the line 7—7 of Fig. 6.

Fig. 8 is an enlarged perspective view of a contacting plate.

Fig. 9 is a view similar to Fig. 6 but showing still a further modified form of stationary and floating contacts.

Fig. 10 is a front elevational view of a radiator for automobile embodying a further modification of the invention.

Fig. 11 is an enlarged vertical sectional view through the top header of the radiator of Fig. 10.

Fig. 12 is a fragmentary view showing a further modification of the device illustrated in Fig. 11.

2

Referring to the drawings, the improved signalling device is shown as associated with a supply tank 5 used in an automobile for storing oil or the like fluid for the vehicle. The tank has an inlet opening 6 with a screw-threaded neck 7 therearound, and has an outlet 8 in its bottom wall. It may also have an auxiliary filler opening with cover as indicated at 6'.

The signalling device comprises a plug 9 and a cylindrical tubular housing or casing 10 depending therefrom. The plug and housing are formed of plastic or other suitable insulating material. The plug has a passage 11 extending centrally therethrough which is internally screw-threaded at its outer end to receive a closure screw 12. This closure screw is formed with an opening 12ª to provide a suitable air passage. The outer periphery of the plug is screw-threaded as indicated at 13 for engagement with the screw threads of the neck 7. The housing is provided with a flange portion 14 at one end, which flange portion is secured to the undersurface of the plug by threaded bolts 15 and 16 passing through openings 17 in the plug and held in place by nuts 18. The bottom of the housing is open as indicated at 19. When the plug is supported by the neck of the tank, the housing 10 extends inwardly into the center of the tank 5 any predetermined distance.

Inside the housing, at opposite sides thereof, are conducting wires 20 extending the length of the housing and having their ends adjacent the outer end of the housing bent outwardly and connected to the bolts 15 and 16 and secured thereto by the nuts 18. The inner ends of the conductors are bent upwardly and inwardly toward the center of the housing and toward each other to provide stationary contacts 21 adjacent the inner end of the housing. The contacts 21 are positioned in the tank at a point where it is considered dangerous for the supply of fluid to reach. A cork ball 22 with a tin foil cover 22ˣ is floatingly mounted wholly within the housing 10, which ball is smaller in diameter than the diameter of the housing so that it may freely move up and down therein, but is larger in diameter than the gap between the contacts 21 so that it can span such gap and engage both contacts when in its lowermost position.

A conductor 23 leads from the bolt 16 to a contact 24 and conductor 25 leads from another contact 26 adjacent to and in line with the contact 24, to one pole of a storage battery 27, of any suitable type. A conductor 28 leads from the opposite pole of the battery to a signalling lamp 29, from which the current is conveyed by a conductor 30 back to the bolt 15 of the plug. The lamp is preferably mounted on the dashboard of the vehicle where it may readily be seen by the operator.

The operation of the device is as follows: the fluid such as oil or the like is placed in the tank 5 through the inlet 6 and escapes through the outlet 8. Preparatory to closing the circuit through the ignition system of the vehicle, the ignition key 31 is inserted into the key slot (not shown). The key comes into contact with the contacts 24 and 26 as shown in Fig. 1 and closes the circuit at this point. The key is left in the slot and after the fluid has fallen to a predetermined point, which is determined by the position of the contacts 21, the ball 22 will come into contact with the contacts 21 and close the circuit through the lamp 29, thereby illuminating the lamp and warning the operator of the vehicle that the supply of fluid is at the danger point and should be replenished.

Instead of the conducting wires 20 of the form of Fig. 1, flat strips of tinfoil 32, as shown in Fig. 4, may be suitably mounted on opposite sides of the interior of the housing 10 and suitably bent at their inner ends to form contacts 33. However, the conductors 20 and 32 may be mounted on the outside of the housing 10 in any suitable manner. Then these conductors may be any shape or size.

Referring now to the form of the invention shown in Fig. 5, the floating contact member herein comprises a cork washer 22' having a lining $22^{xx}$ of tin foil on its under-surface. The washer encircles the casing and its diameter is slightly larger than the diameter of the tubular casing so that it can float on top of the fluid in the tank 5' and be guided in its movement by the casing. The conductors 20' are bent around the bottom ends of the casing and outwardly and upwardly at an angle to provide exterior stationary contacts 21'. When the washer is in its lowermost position, the tin foil lining $22^{xx}$ engages the contacts 21' closing the circuit therethrough for signalling the operator.

In all other respects, the form of invention shown in Fig. 5 is the same as the form of Fig. 2 and similar reference numerals are used to indicate similar parts.

In the modification of the invention shown in Figs. 6 to 8, inclusive, the bottom end of the housing 10 is screw threaded to receive a screw-threaded cap 34. The cap is open except for two opposed finger 35 formed integrally therewith. Each finger 35 supports a semi-circular contacting spring plate member 36. Each contacting plate 36 is formed with separate spring contacting fingers 37 disposed in the plane of the body of the plate and a separate contacting finger 38 disposed at right angles to the plate. The contacting finger 38 is stouter than the fingers 37 and is formed with an outer dished-shape wing-like seat portion 39. Each plate 36 is secured to its supporting finger 35 by a fastening member 40 extending through said finger 35 and through an opening 41 in the inner end of the contacting finger 38. The plates 36 when secured to the supporting fingers 35 of the cap are in opposed relation with a space therebetween.

A screen 42 is supported by the cap 34 over the fingers 35 in order to prevent dust and other foreign matter entering the housing 10 and fouling the contact fingers.

When the cap 34 is screwed onto the housing 10 due to the length of the contacting plate 36, one of its contacting fingers will engage the adjacent conducting strip 32 no matter what its position, and when the ball 22 falls it will seat on the seat portions 39 of the contacting fingers 38 thereby closing the circuit through the lamp 29.

In all other respects, the form of Figs. 5 to 7 is the same as the form of Fig. 4 and similar reference numerals are used to indicate similar parts.

In the form of the invention shown in Fig. 9, the cap 34' on the inner open end of the casing 10'' carries a pair of spaced semi-circular contact members 36' similar to the contact members 36 of the form of Fig. 6. Each of the contact members herein has an arm 38' extending under the bottom end of the casing 10'' and through an aligned opening 43 in the cap 34' adjacent its bottom end. At its outer end, the arm 38' is bent upwardly and outwardly forming a stationary member 39' outside of the cap. A movable contact member in the form of a cork washer 22'' encircles the tubular casing 10'' and is provided with a tin foil lining $22^{xxx}$ which is adapted to engage the contact members 39' for closing the circuit through the conductors 32'.

In all other respects the form of the invention of Fig. 9 is similar to that of Fig. 6 and similar reference numerals are used to indicate similar parts.

Figs. 10 and 11 illustrate a form of the invention applied to a radiator of an automobile having a conventional core portion 44 with top header 45 and bottom header 46. An inlet 47 for water is provided in the front of the top header and an outlet 48 in the bottom header. An opening 49 is formed in the top of the top header 45 and is closed by a radiator cap indicated generally at 50. The cap includes the usual depending peripheral coupling collar 51 adapted for releasable connection with the annular locking flange 52 on the upper end of the filler neck 53 of the radiator. In this form the tubular casing 54 is secured to the center of the cap 50 by the insulated bolts 55 and 56, with a plastic disk 57 interposed between the cap and casing and secured by the bolts. Conducting strips 58 extend along opposite sides of the inner surface of the casing and are secured at their outer ends between the conducting strips and the disk. At their inner ends, the conducting strips extend under the open end of the casing and outwardly and upwardly thereof to form exterior stationary contacts 59. A floating contact member in the form of a cork washer 60 is slidably mounted on the casing 54 and is provided with a tin foil lining 61 on its under-surface for engagement with the contacts 59 when the water in the radiator reaches below said contacts to thereby close the circuit through the conducting strips and conductors 62 for signalling the operator.

In Fig. 12, the conducting wires 70 are shown close to each other and depending downwardly from the plastic or other insulation supports 71. The upper ends 72 of the wires 70 are threaded so that a suitable threaded nut 73 may be used to anchor a connecting wire 74 for closing the circuit.

While I have illustrated and described the preferred embodiments of my invention, it will be understood that I do not limit myself to the precise constructions herein disclosed and the right is reserved to all changes and modifications coming within the scope of the invention as defined in the appended claims

Having thus described my invention, what I claim as new and desire to secure by United States Letters Patent is:

1. In a fluid supply indicator for an automobile supply tank having a threaded inlet opening, an insulating plug threaded in said inlet opening, an insulating tubular housing supported by said plug and extending into said tank, said housing having an open inner end communicating with the interior of the tank, spaced electric contacts inside said housing, and a metallic floating ball in the housing for engaging said contacts when the fluid in the tank reaches a predetermined level.

2. In an electrically operated fluid alarm gauge for automobiles, an electrical contact-supporting unit comprising an insulating plug having metal bolts extending therethrough from top to bottom, an insulating flanged tubular housing secured to one surface of said plug, said housing having an open inner end, conductors along the opposite inner sides of the housing, the outer ends of said conductors being connected to the bolts, the inner ends of said conductors being bent towards each other to form spaced stationary contacts, and a floating metallic ball confined wholly within the housing and arranged to engage said spaced contacts.

3. In an electrically operated fluid alarm gauge for automobiles, an electrical contact-supporting unit comprising an insulating plug having metal bolts extending therethrough from top to bottom, an insulating flanged tubular housing secured to one surface of said plug, said housing having an open inner end, strips of tin foil along the opposite inner surfaces of the housing, the outer ends of said strips being connected to the bolts, the inner ends of said strips being bent towards each other to form spaced stationary contacts, and a floating metallic ball confined wholly within the housing and arranged to engage said spaced contacts.

4. In an electrically operated fluid alarm gauge for automobiles, an electrical contact-supporting unit comprising an insulating plug having metal bolts extending therethrough from top to bottom, an insulating flanged tubular housing secured to one surface of said plug, said housing having an open inner end, strips of conducting material along the opposite inner surfaces of the housing, the outer ends of the strips being connected to said bolts, spaced semi-circular contacting plates in the inner end of said housing, said plates having spaced contacting fingers engaging said conducting strips and having opposed contacting fingers with seat portions, and a floating metallic ball confined wholly within the housing and arranged to engage said seat portions to close a circuit.

5. In an electrically operated fluid alarm gauge for automobiles, an electrical contact-supporting unit comprising an insulating plug having metal bolts extending therethrough from top to bottom, an insulating flanged tubular housing secured to one surface of said plug, said housing having an open inner end, strips of conducting material along the opposite inner surfaces of the housing, the outer ends of the strips being connected to the bolts, a cap removably secured to the inner end of said housing, semi-circular contacting plates carried by said cap in spaced relation, said plates having spaced contacting fingers engaging said conducting strips and having opposed contacting fingers with seat portions, and a floating metallic ball confined wholly within the housing and arranged to engage said seat portions to close a circuit.

6. In a fluid supply indicator for an automobile supply tank having a threaded inlet opening, an insulating plug threaded in said inlet opening, an insulating tubular housing supported by said plug and extending into said tank, said housing having an open inner end communicating with the interior of the tank, spaced electric exterior contact members carried by said housing adjacent its inner end, and a metallic floating washer slidably mounted on said housing and adapted to engage said contact members when the fluid in the tank reaches a predetermined level.

7. In a fluid supply indicator for an automobile supply tank having a threaded inlet opening, an insulating plug threaded in said inlet opening, an insulating tubular housing supported by said plug and extending into said tank, said housing having an open inner end communicating with the interior of the tank, opposed conducting strips extending along the inner surface of said housing and outwardly of the open inner end thereof forming exterior contacts, and a cork washer slidable along the outside of said housing, said washer having a tin foil lining on its under-surface adapted to engage said exterior contacts when the fluid in the tank reaches a predetermined level.

8. In an electrically operated fluid alarm gauge for automobiles, an electrical contact-supporting unit comprising an insulating plug having metal bolts extending therethrough from top to bottom, an insulating flanged tubular housing secured to one surface of said plug, said housing having an open outer end, strips of conducting material along the opposite inner surfaces of the housing, the inner ends of the strips being connected to said bolts, spaced semi-circular contacting plates in the outer end of said housing, said plates having spaced contacting fingers engaging said conducting strips and having opposed arms extending exteriorly of the housing, and a metallic washer floatingly mounted on the outside of the housing and arranged to engage said arms to close a circuit for signalling the operator.

9. In an electrically operated fluid alarm gauge for automobiles, an electrical contact-supporting unit comprising an insulating plug having metal bolts extending therethrough from top to bottom, an insulating flanged tubular housing secured to one surface of said plug, said housing having an open inner end, strips of conducting material along the opposite inner surfaces of the housing, the outer ends of the strips being connected to the bolts, a cap removably secured to the inner end of said housing and having opposed lateral openings, semi-circular contacting plates carried by said cap in spaced relation, said plates having spaced contacting fingers engaging said conducting strips and having opposed contacting arms extending under the inner end of said housing and outwardly through the lateral openings in said cap to provide exterior contacts, and a cork washer floatingly mounted on the outside of said housing, said washer having a tin foil lining on its under surface adapted to engage the exterior contacts to close a circuit for signalling the operator.

10. In a fluid supply indicator for an automobile radiator having an inlet for water and an outlet therefor, said radiator having an opening in its top header with a neck surrounding said opening, a releasable cap closing the opening in said neck, an insulating tubular casing secured to the inner surface of said cap and depending therefrom through said neck into the top header of the radiator, said tubular casing having an open inner end, opposed conducting strips extending along the inner surface of said casing outwardly of the open inner end of the casing to the exterior thereof to form exterior stationary contacts, and a contact member floatingly mounted on the outside of the casing and adapted to engage the stationary contacts to close a signal for signalling the operator.

11. In a fluid supply indicator for an automobile radiator having an inlet for water and an outlet therefor, said radiator having an opening in its top header with a neck surrounding said opening, a releasable cap closing the opening in said neck, an insulating disk secured to the inner surface of the cap at its center, a flanged insulating tubular casing secured to said disk and depending therefrom into the top header of the radiator, said casing having an open inner end, opposed conducting strips extending along the inner surface of said casing and outwardly of the open inner end of the casing to the exterior thereof forming exterior contacts, conductors operatively connected to the outer ends of said conducting strips, and a cork washer floatingly mounted on the outside of said casing, said washer having a tin foil lining on its inner surface for engagement with the exterior contacts to close a circuit for signalling the operator as to the condition of the water supply in the radiator.

HAROLD BERGER.

References Cited in the file of this patent

UNITED STATES PATENTS

| Number | Name | Date |
|---|---|---|
| 106,141 | Duryea | Aug. 9, 1870 |
| 460,895 | Smith | Oct. 6, 1891 |
| 599,220 | Bush | Feb. 15, 1898 |
| 666,451 | Zimmermann | Jan. 22, 1901 |
| 782,703 | Schopbach | Feb. 14, 1905 |
| 1,642,434 | Faunce | Sept. 13, 1927 |
| 1,768,446 | Gron | June 24, 1930 |